United States Patent
Hilgendorf et al.

(10) Patent No.: US 7,321,247 B2
(45) Date of Patent: Jan. 22, 2008

(54) TIMER FACILITY FOR HIGH FREQUENCY PROCESSORS WITH MINIMUM DEPENDENCY OF PROCESSOR FREQUENCY MODES

(75) Inventors: Rolf Hilgendorf, Boeblingen (DE); Cedric Lichtenau, Boeblingen (DE); Michael Fan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 10/926,582

(22) Filed: Aug. 26, 2004

(65) Prior Publication Data

US 2006/0044944 A1    Mar. 2, 2006

(51) Int. Cl.
*H03K 19/00* (2006.01)

(52) U.S. Cl. .................................. 327/141; 327/160

(58) Field of Classification Search ............... 327/141, 327/160–163
See application file for complete search history.

(56) References Cited

U.S. PATENT DOCUMENTS 6,348,823 B1 *   2/2002   Pan ............................. 327/159

* cited by examiner

*Primary Examiner*—Dinh T. Le
(74) *Attorney, Agent, or Firm*—Carr LLP; D'Ann N. Rifai

(57) ABSTRACT

An apparatus, a method, and a computer program are provided for the generation of constant incremental increases while changing core clock frequencies. In computer systems, oftentimes frequency changes are useful. Maintaining the clocking ability of the computer system, though, can be a difficult task. To maintain the time keeping ability, time base logic is utilized with the free-running clock, which can be frequency limited. However, a plurality of communication channels in conjunction with an adder system is employed to effectively adjust for an ever increasing frequency to allow for a effective timekeeping regardless of the core frequency.

13 Claims, 3 Drawing Sheets

TIMER FACILITY FOR HIGH FREQUENCY PROCESSORS WITH MINIMUM DEPENDENCY OF PROCESSOR FREQUENCY MODES

CROSS-REFERENCED APPLICATIONS

This application relates to U.S. patent application Ser. No. 10/687,251 entitled "TIME-BASE IMPLEMENTATION FOR CORRECTING ACCUMULATIVE ERROR WITH CHIP FREQUENCY SCALING", filed on Oct. 16, 2003, which is hereby incorporated by reference.

FIELD OF THE INVENTION

The invention relates generally to supporting an on chip-timer facility and, more particularly, to the generation of a constant incremental increase while changing core clock frequencies.

DESCRIPTION OF THE RELATED ART

Timekeeping is an important function of computer systems. After boot-up, a system clock of a microprocessor (MPU) is initialized to keep time according to the number of clock cycle updates that it receives. In a first configuration, the MPU uses a counter, a reference value, and an accumulator for keeping track of time in the system clock.

Typically, an MPU has a core-clock distribution network that is part of the system clock. The core-clock distribution network is referred to as the core-clock. Every clock cycle, a counter within the core-clock increases its count value. If the value of the counter equals a preset reference value, a signal is sent to an accumulator within the core-clock. The signal that is sent to the accumulator represents an incremental increase in time. This time is used as MPU system-time, for use with such things as time-stamping files, and so forth. After the signal is sent to the accumulator, the counter is reset to zero, and the counter continues to receive time pulses and send accumulator updates each time the reference value is matched. The reference value is set by the MPU. The reference value is a function of the number of clock cycles of the processor per given unit of time.

However, there is a problem with this approach. It can be desirable for the MPU to change its frequency of operation in the middle of a time count. For instance, the MPU is to change from 1 GHZ to 1.33 GHZ when the count of the counter of the core-clock is one or more, but the count does not equal the reference value. This creates a problem. If the MPU keeps the original reference value as the trigger, the timing pulse to the accumulator will originate too quickly and the MPU clock will be too fast. If the MPU changes mid-count to the new reference value, the time increment can be too slow. Furthermore, this error is cumulative. In other words, if the frequency switch occurs a plurality of times, the errors from each switch will add together over time and can be substantial.

In a second approach, the counter of the mesh-core receives its counts directly from a "free-running clock" at a fixed frequency, and not as a function of the frequency of the MPU. The free-running clock can be provided as an external source to the MPU or as a separate internal clock that does not change frequency with the frequency of the MPU. In this implementation, the counter is reset after each addition (or couple of additions). The reset is a function of the MPU clock speed. In this approach, the MPU gives a signal to read the number of oscillations of the free-running clock, and this is added to the accumulator of the core-mesh (the timekeeper that is keeping track of the core frequency count). In this aspect, the counter sends the total count since the last reset to the core clock in parallel and simultaneously with the update signal to the accumulator. The count is added to the accumulator each time the update signal is detected.

An advantage of this approach is that the core core-clock can have its own operating frequency (which is slower than the free-running clock), and the ratio between the free-running clock and the core-clock can be variable. The accumulator of the core-mesh receives the number representing the previous number of oscillations since the last update request and adds this to its current value.

However, one problem with this free-running clock implementation is that the skew between the free-running clock and the core core-clock of the MPU must be matched. Skew can generally be defined as the delay between a transition from one logic level to another logic level. Because the accumulator which resides in the core core-clock domain is receiving the update signal and count in parallel, all signal transitions must be received by the core clock before it sends a reset signal to the counter. As the parallel signals can have differing transmission speeds, the core-clock cannot be sure when the accumulator has received an accumulated count before sending the reset signal to the counter.

One way to compensate for the skew is to require some kind of feedback between the core clock and the free-running clock to inform the free-running clock the actual signal has been received by the accumulator by the core-clock. Such feedback system increases the overhead for each transfer of tic value between the two asynchronous clock domains, and in turn increases the counter size. Furthermore, the free-running clock always has to be the fastest clock, or else the required size of the counter increases in an unbounded fashion. Finally, with parallel propagation of signals, the potential arises for many long wires and signal re-powering circuitry that can be costly to the implementation.

Therefore, there is a need for a method of changing the clock speed of a chip without disrupting the timekeeping ability of the chip in a way that addresses at least some of the problems associated with conventional methods to change clock frequencies on a chip.

SUMMARY OF THE INVENTION

The present invention provides apparatus for keeping time in a clock domain. Free-running clock logic is utilized to provide free-running clock data. The free-running clocks data is then processed by time base logic, which receives the free-running clock data through a plurality of communication channels. Within the time base logic, at least two adders are used. The first adder receives indicia of the free-running clock data and has a number of input channels equal to a number of communication channels. The second adder is the time base adder that increments based on the output of the first adder.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
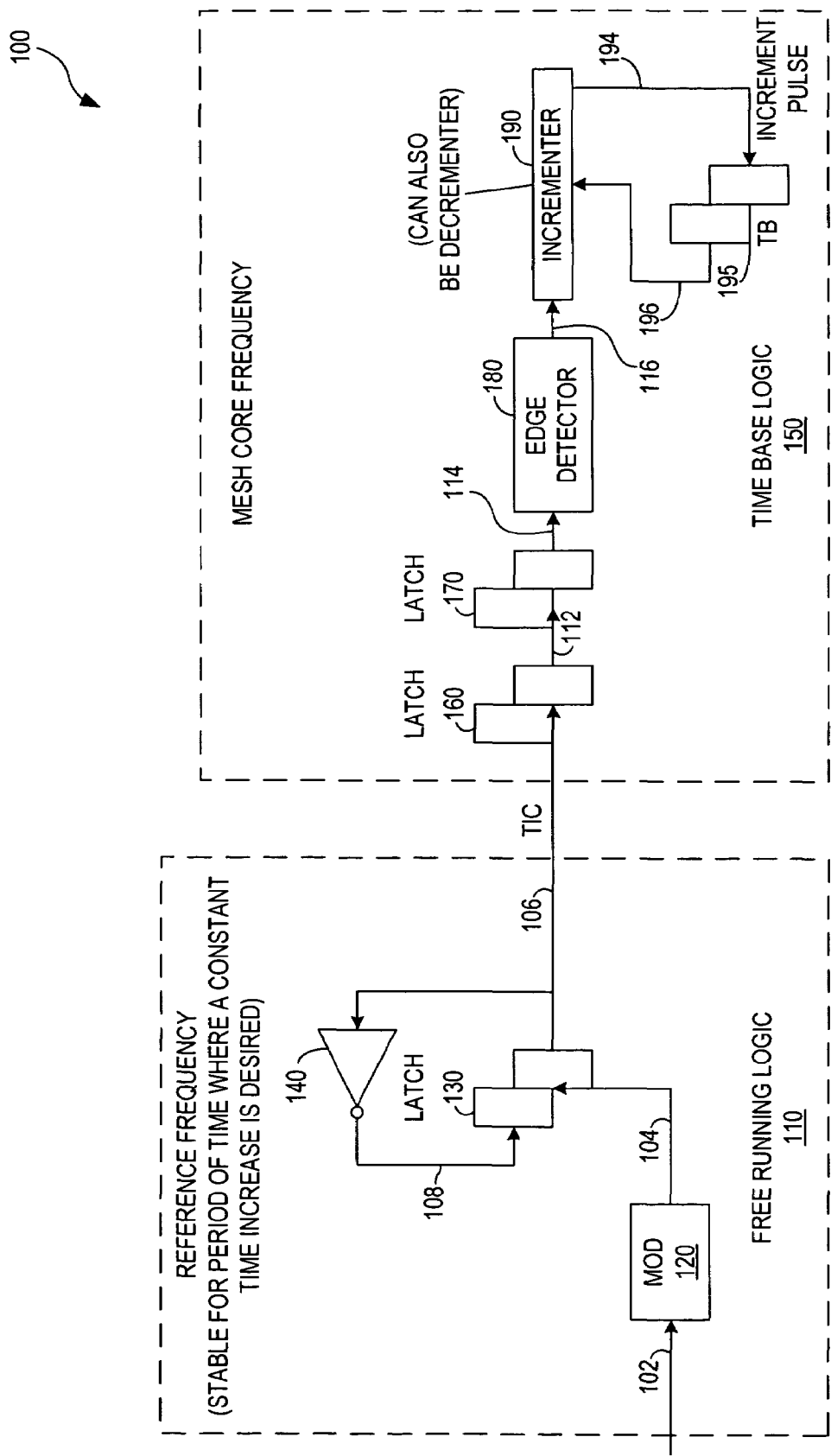
FIG. 1 is a block diagram depicting a free running clock system with a frequency limit.

Referring to FIG. 1 of the drawings, the reference numeral 100 generally designates a free running clock system 100. The free running clock system comprises free running logic 110 and time base logic 150. The free running logic 110 comprises a free running clock 120, a first latch 130, and an inverter 140. The time base logic 150 further comprises a second latch 160, a third latch 170, an edge detector 180, an incrementer 190, and a memory unit 195.

The system 100 functions by first having the free running logic generate a single bit tic value. A time base enable signal is received by the free running clock 120 through a first communication channel 102. Based on the mod number of the free running clock 120, the clock 120 generates a mod signal for every cycle or every few cycles of the free running clock 120 by the use of an internal counter (not shown). The mod signal is outputted to the first latch 130 through a second communication channel 104. Based on the mod signal, the first latch 130 either enables or disables signal propagation to the first latch 130. If the first latch 130 is disabled, then the latch holds its value, and the input of latch 130 remains unchanged; however, if the first latch 130 is enabled, then the input to the first latch 130 is propagated to the output with a one-cycle delay. The input of the first latch 130, though, is based on the output of the first latch 130. The output of the first latch 130 is communicated to the inverter 140 through a third communication channel 106, and the inverted output of the first latch 130 is then input into the first latch 130 through a fourth communication channel 108. Once enabled, the first latch 130 continually toggles as a result of the feedback. The toggling output signal of the first latch 130 is the tic value. In this implementation each edge of the tic signal represents one occurrence of the mod signal from block 120. Other methods of converting pulse to level signal are also acceptable.

Once the tic value has been developed, the tic value is then utilized by the time base logic 150. The second latch 160 of the time base logic 150 receives the tic value through the third communication channel 106. Essentially, though, this tic value is a DC signal that maintains a constant value regardless of the clock domain in which the tic value resides. When the tic value is transmitted to the time base logic 150, changes in the DC signal—that is, the tic value—occur asynchronously with respect to the clock domain in which the DC signal resides. A resulting problem, then, is that latch 160 can be meta-stable. To alleviate the problem of meta-stability, a plurality of secondary input latches can be employed. FIG. 1 specifically depicts a single secondary latch (the third latch 170); however, there can be multiple secondary latches. Therefore, the output of the second latch 160 is input into the third latch 170 through a fifth communication channel 112, and the output of the third latch 170 is outputted to the edge detector 180 through the sixth communication channel 114.

Once the delayed tic value has been received, then the tic value can be further processed. The edge detector 180 monitors the tic value signal for both rising and falling edges, as appropriate. The benefit of detecting both edges is explained in further detail in co-pending U.S. patent application Ser. No. 10/687,251 entitled "TIME-BASE IMPLEMENTATION FOR CORRECTING ACCUMULATIVE ERROR WITH CHIP FREQUENCY SCALING." When an appropriate edge is detected, the edge detector 180 transmits an increment pulse to the incrementer 190 through a seventh communication channel 116. Additionally, the incrementer 190 receives the present time base value stored on the memory unit 195 through an eighth communication channel 196. An incremented value is then transmitted from the incrementer 190 to the memory unit 195 through a ninth communication channel 194.

The tic rate associated with the tic value, however, has several limiting factors: slowest core frequency ($CCT_{slow}$), time lost during frequency switching ($T_{switch}$), and the number of cycles to increment the time base value ($CP_{inc}$). $CCT_{slow}$ is generally defined as the maximum core frequency divided by n, where n is the core frequency divider value used in generating the slow core-clock frequency. $T_{switch}$ is generally defined as the time with no clock, and $CP_{inc}$ is generally defined as the cycles per increment. There can also be other factors that can influence the performance of the time base implementation.

The requirements and limitations are then a function of the limiting factors. A first restriction is that the $T_{window}$, which is the time between a rising an falling edge of the tic signal, is at least the period of time necessary to handle the sum of the following timing elements: delay for meta-stability of a signal when such signal is entering from an asynchronous domain, time lost during frequency change, time to increment the timebase counter value, and time for guard band. In other words, the first restriction is as follows:

$$T_{window} >= CCT_{slow} + T_{switch} + (CCT_{slow} * CP_{inc}) + \text{GuardBand} \quad (1)$$

The guard band can be generally defined as extra time to allow for variations of conditions within the system 100, such as temperature, speed of propagation of signals, and so on.

A second restriction is the granularity of Mod 120, and free-clock frequency. The second restriction is defined as follows:

$$T_{tic} = CCT_{freeclk} * MOD_{min}, \quad (2)$$

where $MOD_{min}$ is the smallest number the system implementation can support to satisfy equation 3.

$$CCT_{freeclk} * MOD_{min} >= T_{window} \quad (3)$$

The inverse of $T_{tic}$ is then the fastest tic frequency the system implementation can support.

As an example, consider a processor core frequency of 4 Ghz and a divider value of 10. Also, $T_{switch}$ is 1 fast clock cycle time plus 1 slow clock cycle time. Additionally, $CP_{inc}$ is 8 because the time base is 64b with an 8b ripple adder. Hence, the requirements are as follows:
(a) $CCT_{fast}=1/(4\ GHz)=0.25$ ns
(b) $CCT_{slow}=10*CCT_{fast}=2.5$ ns
(c) $T_{switch}=CCT_{fast}+CCT_{slow}=2.75$ ns
(d) Assume GuardBand=1.0 ns
(e) $T_{window}>=2.5$ ns+2.75 ns+(2.5 ns*8)+1.0 ns $>=26.25$ ns
(f) Assume $CCT_{freeclk}=2$ ns (given a 500 Mhz reference clock.)
(g) $MOD_{min}=14$
(h) Max tic rate=28 ns
(i) Max tic frequency=1/28 ns=35.7 Mhz It is clear that the system 100 does have limitations. Primarily, there are frequency limitations associated with the use of the system 100. Many system, though, so not support these frequencies. Some older systems in fact generally support higher tic frequencies in the range of 66 Mhz to 250 Mhz.

Figure 2:
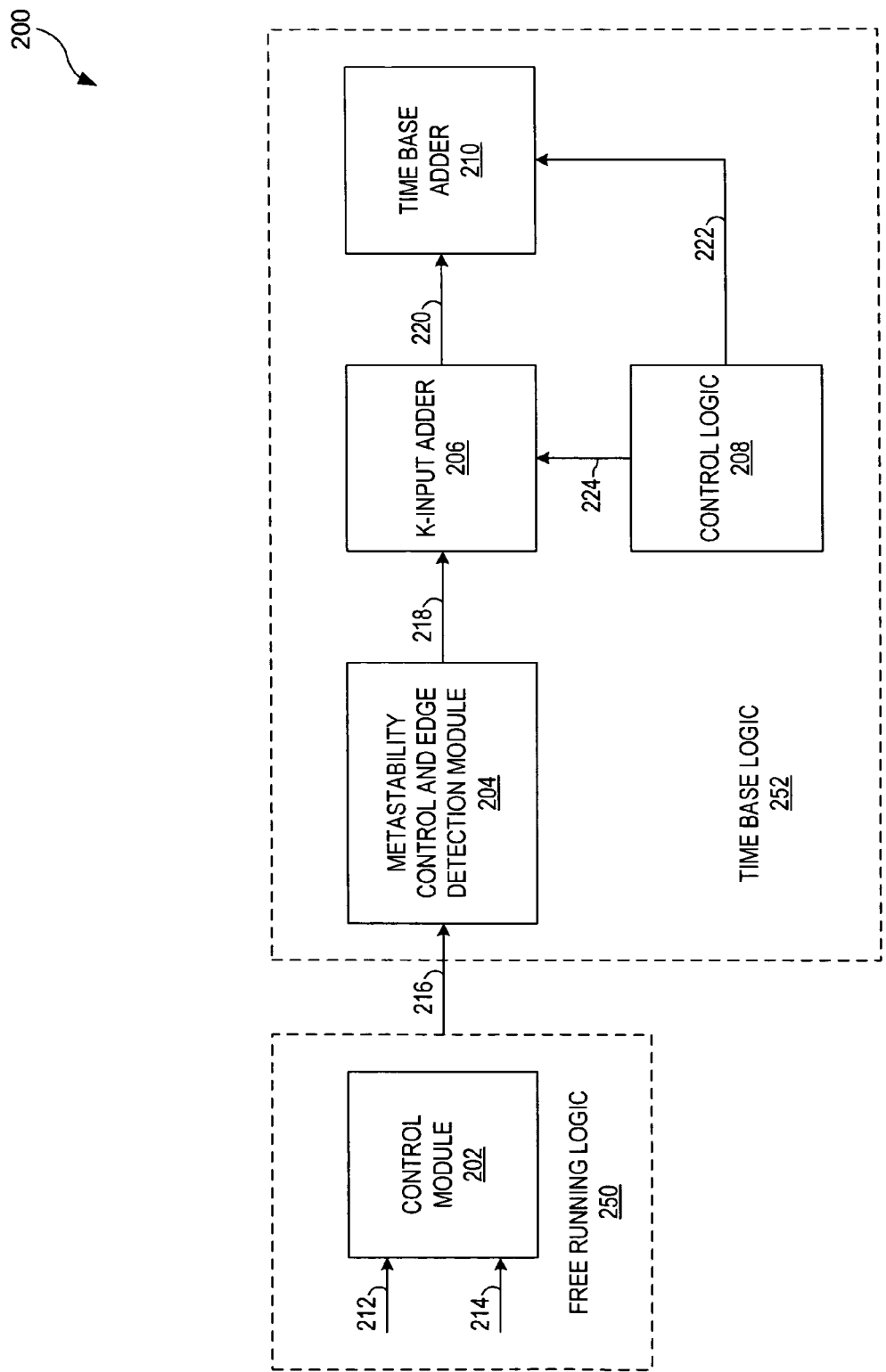
FIG. 2 is a block diagram depicting a free running clock system with no frequency limit.
Figure 3:
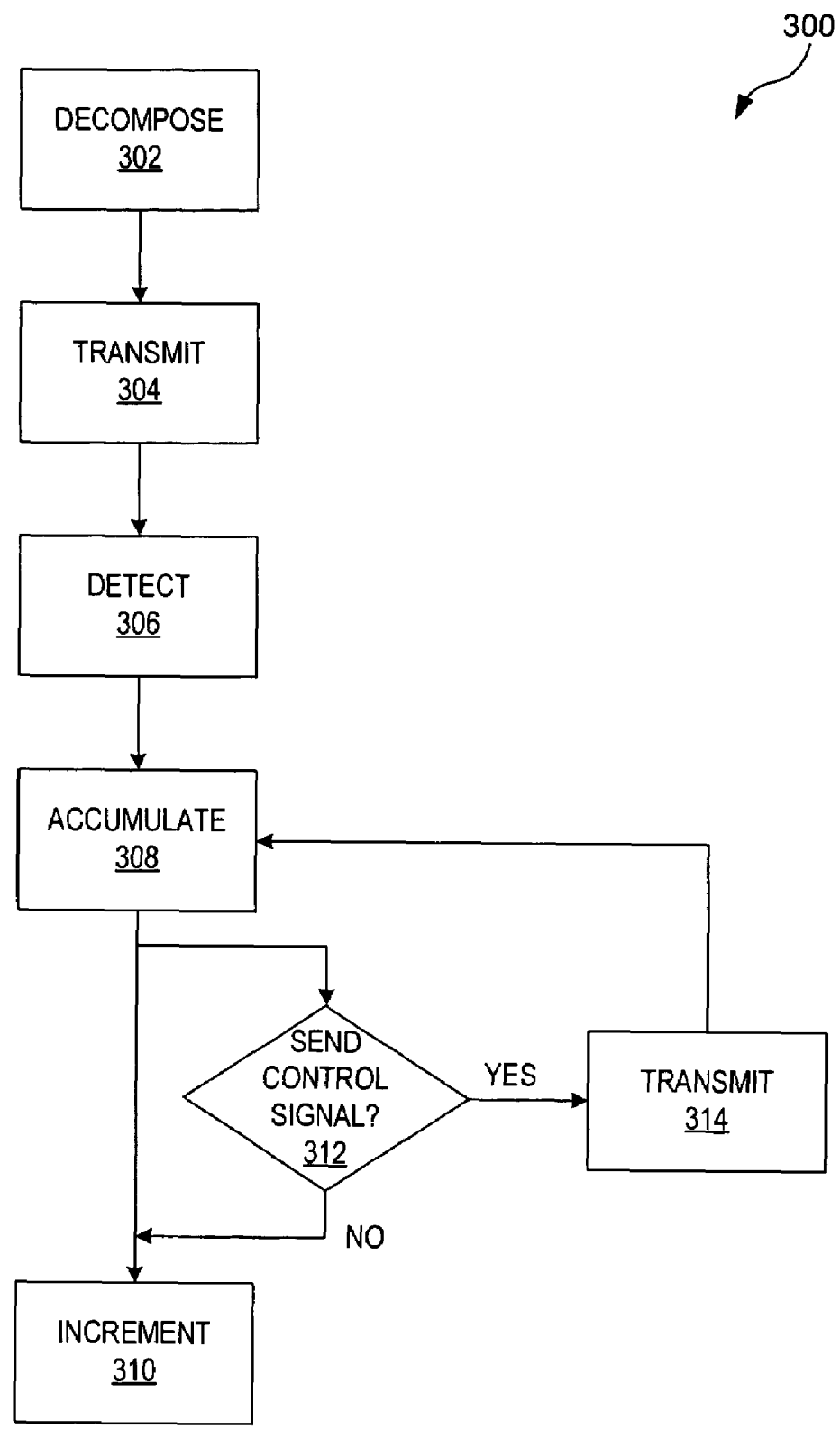
FIG. 3 is a flow chart depicting the operation of a free running clock system with no frequency limit.

In order to alleviate the limitations associated with the system 100, a modified free running clock system can be employed. Referring to FIGS. 2 and 3 of the drawings, the reference numerals 200 and 300 generally designates a modified free running system and corresponding flow chart. The modified free running system 200 comprises free running logic 250 and time base logic 252. The free running logic 250 further comprises a control module 202. The time base logic 252 further comprises a metastability control and edge detection module 204, a k-input adder 206, control logic 208, and a time base adder 210.

The functionality of the system 200 is similar to that of the system 100; however, the system 200 is enabled to handle and produce higher tic frequencies. The control module 202 receives a time base enable signal and a hard reset signal through the first communication channel 212 and a second communication channel 214, respectively. The enable signal input acts as a switch either enabling or disabling the functionality of the control module 202, where the hard reset can reset the control module. A control module 202 does not require an enable or a hard reset, but it is advantageous to have enable and hard reset to have better control of the logic. Internally, the control module 202 decomposes a fast tic into many slow tics, as in step 302. The control module 202 can simply be a plurality of free running logic modules, such as the free running logic 110 of FIG. 1, or other implementations can be used. These tic pulses are communicated in step 304 to the time base logic 252 through a third communication channel 216. Also, multiple communication channels are typically utilized to transmit the tic pulses; however, certain implementations can allow for the use of a single communication channel. The number of communication channels, though, is dependent on several factors, such as the latch to latch transfer rate of the free running clock domain, the core clock, and free running clock frequency. Therefore, independent pulses are transmitted over the communication channel(s) 216.

Once the tic pulses have been produced, the time base logic 252 begins to process the inputted values. The tic pulses are transmitted to the metastability control and edge detection module 204 through the third communication channel 216. As a result of the tic pulses being DC signals, there, again, can be problems associated with slow transitions times. Typically, a plurality of primary and a plurality of secondary latches (not shown) are used to for reception of the tic values and metastability control. Then, the module 204 can produce incrementing signals, as appropriate, that are transmitted in step 306 to the k-input adder 206 via a fourth communication channel 218. The module 204, typically, utilizes edge detection logic, such as the edge detector 180, to determine a rising or falling edge of a tic signal, as appropriate. Also, a single communication channel 218, as shown, or multiple communication channels can be utilized to transmit incrementing signals to the k-input adder 206. The k-input adder 206 then accumulates tic pulses in step 308 and feeds the time base adder 210 at some rate slower or equal to the rate the time base adder 210 can add. The k-input adder 206 outputs incrementing data to the time base adder 210 through a fifth communication channel 220 in step 310. The control logic 208 also provides control signals through add or update requests to the time base adder 210 through a sixth communication channel 222 in steps 312 and 314. Also, the control logic 208 provides a reset signal through a seventh communication channel 224 to the k-input adder 206, so that after a current adder value is added to the timebase adder 210, the k-input adder can be reset to prevent double counting of pulses. The control logic 208 feeds the time base adder 210 an adder value periodically because some adders can add for a minimum number of cycles. However, if a time base adder 210 can add every cycle, the control logic 208 is not needed, and the k-input adder 206 should reset its value every cycle after its value is added to the timebase adder 210.

As mentioned above, the number of communication channels 216 required ($N_{c216min}$) depends on many factors. The restrictions are as follows:

$$T_{window2}>=CCT_{slow}+T_{switch}+\text{GuardBand} \quad (4)$$

$$CCT_{freeclk}*MOD_{min}>=T_{window2}, \quad (5)$$

where $MOD_{min}$ is the smallest number the system implementation can support to satisfy equation 5.

$$T_{tic\_216}=CCT_{freeclk}*MOD_{min}, \quad (6)$$

$$N_{c216min}>=T_{tic\_216}/T_{tic\_desired}, \quad (7)$$

where $N_{c216min}$ is the smallest integer that can satisfy equation 7.

As an example, assume the same conditions in the earlier example, which are as follows:
(j) $T_{window2}>=2.5$ ns+2.75 ns+1.0 ns=6.26 ns
(k) $MOD_{min}=4$
(l) $T_{tic\_216}=2$ ns*4=8 ns
(m) Assume $T_{tic\_desired}$ is 4 ns (Tic frequency desired is 250 Mhz.)
(n) $N_{c216min}=2$ As a result, the system 200 is capable of maintaining any time base frequency. By varying the number of divisions of tic frequency and adjusting the number of adder inputs, any frequency can be maintained. The utilization of the system 200, therefore, has increased utility and flexibility.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for keeping time in a clock domain, comprising:
    free-running clock logic that is at least configured to provide a first tic signal, and comprising free-running clock control logic;
    wherein the free-running clock control logic is at least configured to decompose the first tic signal into a plurality of slower tic signals; and
    time base logic that is at least configured to receive each of the plurality of slower tic signals through an associated communication channel, the time base logic comprising:
        at least one adder with a number of input channels equal to a number of the plurality of slower tic signals and configured to receive the plurality of slower tic signals; and
        at least one time base adder coupled to the at least one adder.

2. The apparatus of claim 1, wherein the time base logic farther comprises control logic to provide control signals to the time base adder.

3. The apparatus of claim 1, wherein the time base logic flirt her comprises a control and detection module that is at least coupled to each associated communication channel.

4. The apparatus of claim 3, wherein the control and detection module further comprises:
    a plurality of latches that are at least configured to provide metastability control; and
    a plurality of edge detection modules that are at least configured to provide edge detection based on signals emitted from the plurality of latches.

5. The apparatus of claim 4, wherein the plurality of latches further comprise:
    a plurality of primary latches, wherein each primary latch of the plurality of primary latches is at least configured to be coupled to at least one associated communication channel; and
    a plurality of secondary latches, wherein the each secondary latch is at least configured to be coupled to an output of at least one primary latch of the plurality of primary latches.

6. A method for keeping time in a clock domain having a time base value, comprising:
    decomposing a tic signal into a plurality of slower tic signals, each tic signal comprising a rising edge and a falling edge;
    processing the plurality of slower tic signals, wherein processing comprises detecting a plurality of tic signal edges;
    accumulating processed tic signals; and
    adjusting the time base value in response to accumulated processed tic signals.

7. The method of claim 6, wherein the step of accumulating further comprises adding the processed tic signals.

8. The method of claim 6, wherein the step of adjusting further comprises adding accumulated tic signals by a time base adder.

9. The method of claim 8, wherein the step of adjusting further comprises:
    determining if the time base adder can add every cycle; and
    if the time base adder cannot add every cycle, providing a control signal.

10. A computer program product for keeping time in a clock domain having a time base value, the computer program product having a computer-readable medium with a computer program embodied thereon, the computer program comprising:
    computer code for decomposing a tic signal into a plurality of slower tic signals, each tic signal comprising a rising edge and a falling edge;
    computer code for processing the plurality of slower tic signals, wherein processing comprises detecting a plurality of tic signal edges;
    computer code for accumulating processed tic signals; and computer code for adjusting the time base value in response to accumulated processed tic signals.

11. The computer program product of claim 10, wherein the computer code for accumulating further comprises computer code for adding the processed tic signals.

12. The computer program product of claim 10, wherein the computer code for adjusting further comprises computer code for adding accumulated tic signals by a time base adder.

13. The computer program product of claim 12, wherein the computer code for adjusting further comprises:
    computer code for determining if the time base adder can add every cycle; and if the time base adder cannot add every cycle, computer code for providing a control signal.

* * * * *